(12) United States Patent
Yamada et al.

(10) Patent No.: US 6,734,351 B2
(45) Date of Patent: May 11, 2004

(54) APPARATUS AND METHOD FOR SAMPLING AND STORING AUDIO INFORMATION AND APPARATUS FOR OUTPUTTING AUDIO INFORMATION

(75) Inventors: Youichi Yamada, Tokorozawa (JP); Takeaki Funada, Tokorozawa (JP); Kazuo Kamei, Tokorozawa (JP); Gen Inoshita, Tokyo-to (JP); Kou Atsumi, Tokyo-to (JP); Junichi Takagaki, Tokorozawa (JP); Akiharu Yagi, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 10/421,901

(22) Filed: Apr. 24, 2003

(65) Prior Publication Data

US 2003/0205123 A1 Nov. 6, 2003

Related U.S. Application Data

(62) Division of application No. 09/626,116, filed on Jul. 26, 2000, now Pat. No. 6,630,621.

(30) Foreign Application Priority Data

Jul. 26, 1999 (JP) .......................... P11-211277

(51) Int. Cl.$^7$ ................................................ G10H 7/00
(52) U.S. Cl. ........................................................ 84/603
(58) Field of Search ..................... 84/603–605, 609–614

(56) References Cited

U.S. PATENT DOCUMENTS

| 4,395,931 | A  |     | 8/1983  | Wachi           |
|-----------|----|-----|---------|-----------------|
| 4,942,799 | A  |     | 7/1990  | Suzuki          |
| 5,686,682 | A  |     | 11/1997 | Ohshima et al.  |
| 5,973,255 | A  |     | 10/1999 | Tanji           |
| 6,137,046 | A  |     | 10/2000 | Kamiya          |
| 6,150,598 | A  |     | 11/2000 | Suzuki et al.   |
| 6,180,863 | B1 |     | 1/2001  | Tamura          |
| 6,343,055 | B1 | *   | 1/2002  | Ema et al. ............... 369/53.16 |

* cited by examiner

*Primary Examiner*—Jeffrey Donels
(74) *Attorney, Agent, or Firm*—Young & Thompson

(57) ABSTRACT

An apparatus for sampling partial audio information from audio information and storing it in a memory device provided with: a sampling device for sampling the partial audio information from the audio information in the sampling time which is a integral multiple of a time interval between each beat and the next in the audio information, and a storing device for storing the sampled partial audio information in a memory device.

17 Claims, 3 Drawing Sheets

APPARATUS AND METHOD FOR SAMPLING AND STORING AUDIO INFORMATION AND APPARATUS FOR OUTPUTTING AUDIO INFORMATION

This application is a division of application Ser. No. 09/626,116, filed on Jul. 26, 2000, now U.S. Pat. No. 6,630,621 the entire contents of which are hereby incorporated by reference.

BACKGROUND OF THE INVENTION

1. Field of the Invention

The present invention relates to an apparatus and a method for storing and controlling audio information, and an apparatus for outputting audio information. Further in detail, the present invention relates to the apparatus and the method for sampling a part of audio information such as tunes for dancing, and storing it in a memory, and reusing it.

2. Description of the Related Art

A conventional audio information storing and controlling device, so called a sampler, is generalized. The device samples a part of a tune from the tune, and stores it temporarily to combine it with another tune and output a new tune. In the conventional sampler start and end timing of sampling a part in a tune is freely designated by a user. Therefore the sampler samples the part at the designated start and end timing.

Incidentally, in recent years, a nightclub, where young people enjoy dancing while getting into the rhythmical music, is in fashion. In this kind of nightclub it is required that a plurality of tunes are kept playing at a constant rhythm continuously even in the interval between different tunes.

Rhythm is defined as repeating of strength and weakness of sound of a tune, that is, beat.

Further one who can keep playing the tunes is called a disc jockey. He selects and combines some tunes outputted from a plurality of reproduction devices to keep playing at a constant rhythm continuously even in the interval between different tunes.

He also samples a part from the tune, and plays it repeatedly while combining it with another tune by using the sampler.

However, in the conventional sampler, the sampling is performed according to the designated start and end timing by a user like the disc jockey, so that in some cases the rhythm of the starting portion of the sampled part is not in time to the rhythm of the ending portion of that. In other words, if the part is repeatedly played, the continuity of rhythm is lost at the time of the transition from the ending portion to the starting portion in some cases.

If this kind of part is repeatedly played in the nightclub, the tune is getting out of rhythm so that it is inconvenience to people who is dancing.

To prevent the tune from getting out of rhythm, an operator like the disk jockey has to combine the part and another tune while keeping the conformity of rhythm every repeat timing. Therefore the operation becomes very complicated.

SUMMARY OF THE INVENTION

It is therefore an object of the present invention to provide apparatus and method for storing and controlling audio information and apparatus for outputting audio information which can easily sample and store a part from a tune in order to prevent the part from getting out of rhythm at the time of repeating and prevent the tune from getting out of rhythm at the time of combining.

The above object of the present invention can be achieved by an apparatus for sampling partial audio information from audio information and storing it in a memory device. The apparatus for sampling partial audio information from audio information and storing it in a memory device is provided with: a sampling device for sampling the partial audio information from the audio information in the sampling time which is a integral multiple of a time interval between each beat and the next in the audio information, and a storing device for storing the sampled partial audio information in a memory device.

According to the apparatus for sampling partial audio information from audio information and storing it in a memory device, a sampling device samples the partial audio information from the audio information. In the sampling the sampling time is a integral multiple of a time interval between each beat and the next in the audio information. Then a storing device stores the sampled partial audio information in a memory device.

Therefore the sampling time is a integral multiple of a time interval between each beat and the next in the audio information. Therefore if the partial audio information is repeatedly reproduced, the reproduced tune is not getting out of rhythm. Further if the repeated partial audio information is combined with another audio information, the reproduced tune is not getting out of rhythm.

In one aspect of the apparatus for sampling partial audio information from audio information and storing it in a memory device, a detecting device detects the number of beats per a predetermined unit of time in the audio information. Further a designating device designates the number of beats in the partial audio information. Then a calculating device calculates the sampling time on the basis of the detected number of beats per a predetermined unit of time and the designated number of beats. Then the sampling device samples the partial audio information from the audio information in the calculated sampling time.

According to this aspect, the sampling time is calculated on the basis of the detected number of beats per a predetermined unit of time and the designated number of beats so that it is possible to calculate the sampling time easily and sample the partial audio information appropriately.

In another aspect of the apparatus for sampling partial audio information from audio information and storing it in a memory device, the sampling device starts sampling from the timing of beats in the audio information.

According to this aspect, if the sampled and stored partial audio information is combined with another audio information, it is easy to keep in conformity rhythm between the sampled partial audio information and the another audio information.

In another aspect of the apparatus for sampling partial audio information from audio information and storing it in a memory device, an outputting device reads the stored partial audio information from the memory device, and outputs it with another audio information.

According to this aspect, if the sampled and stored partial audio information is combined with another audio information, it is easy to keep in conformity rhythm between the sampled partial audio information and the another audio information. Further the tune according to the sampled partial audio information and the another audio information is reproduced keeping in conformity rhythm.

The above object of the present invention can be achieved by an apparatus for sampling partial audio information from audio information and storing it in a memory device. The apparatus for sampling partial audio information from audio information and storing it in a memory device is provided with: a detecting device for detecting the number of beats per a predetermined unit of time in the audio information; a designating device for designating the number of beats in the partial audio information; a calculating device for calculating the sampling time on the basis of the detected number of beats per a predetermined unit of time and the designated number of beats; a sampling device for sampling the partial audio information from the audio information in the sampling time which is a integral multiple of a time interval between each beat and the next in the audio information; a storing device for storing the sampled partial audio information in a memory device, and wherein said sampling device samples the partial audio information from the audio information in the calculated sampling time, and wherein said storing device stores at least either the number of beats per a predetermined unit of time or the designated number of beats in the partial audio information in the memory device with the partial audio information.

According to the apparatus for sampling partial audio information from audio information and storing it in a memory device, a detecting device detects the number of beats per a predetermined unit of time in the audio information. Further a designating device designates the number of beats in the partial audio information. Then a calculating device calculates the sampling time on the basis of the detected number of beats per a predetermined unit of time and the designated number of beats. Then the sampling device samples the partial audio information from the audio information in the calculated sampling time. The calculated sampling time is a integral multiple of a time interval between each beat and the next in the audio information. Then a storing device stores at least either the number of beats per a predetermined unit of time or the designated number of beats in the partial audio information in the memory device with the partial audio information.

Therefore the sampling time is a integral multiple of a time interval between each beat and the next in the audio information. As a result, if the partial audio information is repeatedly reproduced, the reproduced tune is not getting out of rhythm. Further if the repeated partial audio information is combined with another audio information, the reproduced tune is not getting out of rhythm. Furthermore, the sampling time is calculated on the basis of the detected number of beats per a predetermined unit of time and the designated number of beats so that it is possible to calculate the sampling time easily and sample the partial audio information appropriately. Moreover, the storing device stores at least either the number of beats per a predetermined unit of time or the number of beats in the partial audio information in the memory device with the partial audio information. Therefore if the sampled and stored partial audio information is combined with another audio information, it is easy to keep in conformity rhythm between the sampled partial audio information and the another audio information.

In another aspect of the apparatus for sampling partial audio information from audio information and storing it in a memory device, an outputting device reads the stored partial audio information from the memory device, and outputs it with another audio information.

According to this aspect, if the sampled and stored partial audio information is combined with another audio information, it is easy to keep in conformity rhythm between the sampled partial audio information and the another audio information. Further the tune according to the sampled partial audio information and the another audio information is reproduced keeping in conformity rhythm.

The above object of the present invention can be achieved by a method of sampling partial audio information from audio information and storing it in a memory device. The method of sampling partial audio information from audio information and storing it in a memory device is provided with: a sampling process of sampling the partial audio information from the audio information in the sampling time which is a integral multiple of a time interval between each beat and the next in the audio information, and a storing process of storing the sampled partial audio information in a memory device.

According to the method of sampling partial audio information from audio information and storing it in a memory device, a sampling process samples the partial audio information from the audio information. In the sampling, sampling time is a integral multiple of a time interval between each beat and the next in the audio information. Then a storing process stores the sampled partial audio information in a memory device.

Therefore the sampling time is a integral multiple of a time interval between each beat and the next in the audio information. Therefore if the partial audio information is repeatedly reproduced, the reproduced tune is not getting out of rhythm. Further if the repeated partial audio information is combined with another audio information, the reproduced tune is not getting out of rhythm.

In one aspect of the method of sampling partial audio information from audio information and storing it in a memory device, a detecting process detects the number of beats per a predetermined unit of time in the audio information. Further a designating process designates the number of beats in the partial audio information. Then a calculating process calculates the sampling time on the basis of the detected number of beats per a predetermined unit of time and the designated number of beats. Then the sampling process samples the partial audio information from the audio information in the calculated sampling time.

According to this aspect, the sampling time is calculated on the basis of the detected number of beats per a predetermined unit of time and the designated number of beats so that it is possible to calculate the sampling time easily and sample the partial audio information appropriately.

In another aspect of the method of sampling partial audio information from audio information and storing it in a memory device, the sampling process starts sampling from the timing of beats in the audio information.

According to this aspect, if the sampled and stored partial audio information is combined with another audio information, it is easy to keep in conformity rhythm between the sampled partial audio information and the another audio information.

In another aspect of the method of sampling partial audio information from audio information and storing it in a memory device, an outputting device reads the stored partial audio information from the memory device, and outputs it with another audio information.

According to this aspect, if the sampled and stored partial audio information is combined with another audio information, it is easy to keep in conformity rhythm between the sampled partial audio information and the another audio information. Further the tune according to the sampled partial audio information and the another audio information is reproduced keeping in conformity rhythm.

The above object of the present invention can be achieved by an method of sampling partial audio information from audio information and storing it in a memory device. The method of sampling partial audio information from audio information and storing it in a memory device is provided with: a detecting process of detecting the number of beats per a predetermined unit of time in the audio information; a designating process of designating the number of beats in the partial audio information; a calculating process of calculating the sampling time on the basis of the detected number of beats per a predetermined unit of time and the designated number of beats; a sampling device for sampling the partial audio information from the audio information in the sampling time which is a integral multiple of a time interval between each beat and the next in the audio information; a storing process of storing the sampled partial audio information in a memory device, and wherein said sampling device samples the partial audio information from the audio information in the calculated sampling time, and wherein said storing process stores at least either the number of beats per a predetermined unit of time or the number of beats in the partial audio information in the memory device with the partial audio information.

According to the method of sampling partial audio information from audio information and storing it in a memory device, a detecting process detects the number of beats per a predetermined unit of time in the audio information. Further a designating process designates the number of beats in the partial audio information. Then a calculating process calculates the sampling time on the basis of the detected number of beats per a predetermined unit of time and the designated number of beats. Then the sampling process samples the partial audio information from the audio information in the calculated sampling time. The calculated sampling time is a integral multiple of a time interval between each beat and the next in the audio information. Then a storing process stores at least either the number of beats per a predetermined unit of time or the number of beats in the partial audio information in the memory device with the partial audio information.

Therefore the sampling time is a integral multiple of a time interval between each beat and the next in the audio information. As a result, if the partial audio information is repeatedly reproduced, the reproduced tune is not getting out of rhythm. Further if the repeated partial audio information is combined with another audio information, the reproduced tune is not getting out of rhythm. Furthermore, the sampling time is calculated on the basis of the detected number of beats per a predetermined unit of time and the designated number of beats so that it is possible to calculate the sampling time easily and sample the partial audio information appropriately. Moreover, the storing process stores at least either the number of beats per a predetermined unit of time or the number of beats in the partial audio information in the memory device with the partial audio information. Therefore if the sampled and stored partial audio information is combined with another audio information, it is easy to keep in conformity rhythm between the sampled partial audio information and the another audio information.

In another aspect of the method of sampling partial audio information from audio information and storing it in a memory device, an outputting process reads the stored partial audio information from the memory device, and outputs it with another audio information.

According to this aspect, if the sampled and stored partial audio information is combined with another audio information, it is easy to keep in conformity rhythm between the sampled partial audio information and the another audio information. Further the tune according to the sampled partial audio information and the another audio information is reproduced keeping in conformity rhythm.

DETAILED DESCRIPTION OF THE PREFERRED EMBODIMENTS

Referring to the accompanying drawings, an embodiment of the present invention will be explained.

In the embodiment, the present invention is adapted for an audio information outputting device for playing tunes in a place like the nightclub. Further the device includes an audio mixer which combines tunes outputted from a plurality of players and composes a tune for play.

Figure 1:
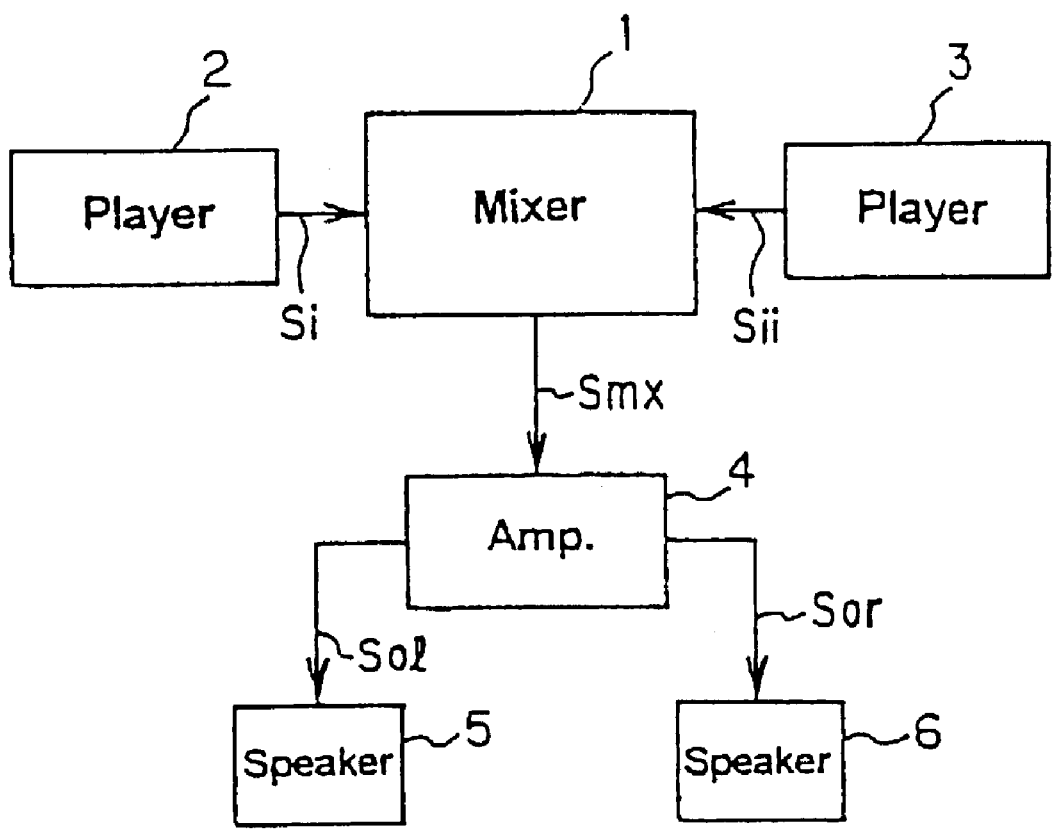
FIG. 1 is a block diagram for showing outline construction of an audio information outputting device as an embodiment of the present invention.

At first, the outline of construction and operation of the device will be explained referring to FIG. 1. FIG. 1 is a block diagram for showing the outline of construction of the device in the embodiment.

As shown in FIG. 1, an audio information outputting device S in the embodiment includes a mixer 1, a player 2, a player 3, an amplifier 4, a speaker 5, and a speaker 6. The player 2, 3 may be an analog player reproducing an analog record, or a digital player reproducing a CD (Compact Disc) or a DVD in digital scheme.

Next, the outline of the device S will be explained. Each of a player 2, 3 respectively reproduces an analog record, a CD or the like, respectively generating a tune signal Si and a tune signal Sii including a plurality of tunes, respectively outputting the signals to the audio mixer 1.

According to operation by the disk jockey, the audio mixer 1 combines the tune signals Si and Sii, generating a mixer signal Smx, and outputting it to the amplifier 4.

The amplifier 4 separates a signal for a left channel and a signal for a right channel from each of tunes included in the mixer signal Smx. The amplifier 4 also amplifies the signals generating a left signal Sol and a right signal Sor. The left signal Sol includes audio information to be included in the left channel. The right signal Sor includes information to be included in the right channel. The audio information includes both of sound information regarding to sound of a musical instrument, etc., and voice information regarding to a singing voice, etc. Hereinafter the audio information is defined in the same way. Further the amplifier 4 outputs the left signal Sol to the speaker 5 for the left channel and the right signal Sor to the speaker 6 for the right channel.

In this manner the audio information included in the left signal Sol and the right signal Sor is outputted as a sound in the nightclub by the speakers 5, 6.

An operation of combining the first tune included in the tune signal Si and the second tune included in the tune signal Sii is performed in the audio mixer 1 as follows: For example, the first tune is audibly reproduced in the nightclub. Concurrently the second tune is reproduced so that only the disk jockey can listen to it, for example, by using a headphone while adjusting rhythm of the second tune so that rhythm of the first tune is in time to rhythm of the second tune. Then if the ending of the first tune is getting near, a part near the ending is faded out. That is, sound pressure level of the part is being decreased gradually according to passage of time and gotten to zero eventually. Then an introduction part of the second tune is continuously fade in. That is, sound pressure level of the introduction part is being increased gradually according to passage of time and gotten to original level eventually. In this manner the combining operation has completed.

Further in the audio mixer 1 the below-mentioned sampling operation is also executed so that a part of tune reproduced by the player 2 is sampled and the sampled part is combined with another tune reproduced by the player 3.

Next, the detail construction and operation of the mixer 1 will be explained referring to FIG. 2.

Figure 2:
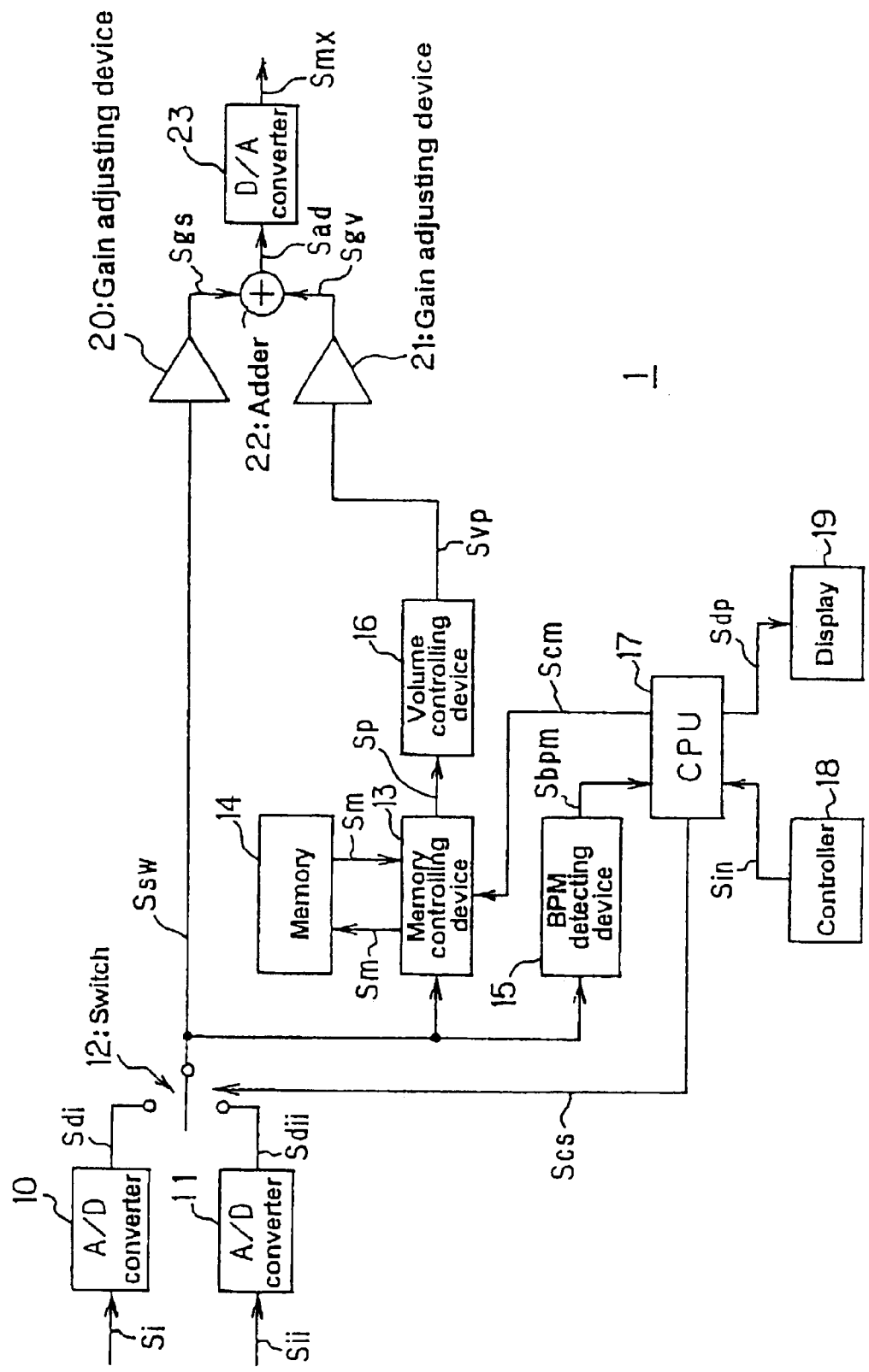
FIG. 2 is a block diagram for showing detail construction of a mixer of the audio information outputting device as an embodiment of the present invention.

As shown in FIG. 2, the mixer 1 of the embodiment includes A/D (Analog to Digital) converters 10, 11, a switch 12, a memory controlling device 13, a memory 14, a BPM (Beat Per Minute) detecting device 15, a volume controlling device 16, a CPU 17, a controller 18, display 19, a gain adjusting devices 20, 21, an adding device 22, and a D/A (Digital to Analog) converter 23.

Next, each of components will be explained. The A/D converter 10 converts the tune signal Si, which is an analog signal outputted by the player 2, into a digital signal, and generates a digital tune signal Sdi, and outputs it to one of two input terminals of the switch 12.

The A/D converter 11 converts the tune signal Sii, which is an analog signal outputted by the player 3, into a digital signal, and generates a digital tune signal Sdii, and outputs it to the other of two input terminals of the switch 12.

The switch 12 selects either the digital tune signal Sdi or the digital tune signal Sdii as a switch signal Ssw according to the below-mentioned control signal Scs outputted by the CPU 17, and outputs the switch signal Ssw to the gain adjusting devices 20, the memory controlling device 13, and the BPM detecting device 15.

The BPM detecting device 15 detects the number of beat per a minute (hereinafter called the value of BPM) in a tune for sampling in the manner of the present invention which is one of the tunes included in the switch signal Ssw, and generates a detection signal Sbpm, and outputs it to the CPU 17.

The operation of detecting the value of BPM by the BPM detecting device 15 is specifically explained as follows: At first the time length between each beat and the next in the tune for sampling is continuously detected in definite period of time. Then the value of BPM is calculated on the basis of statistics on the time length detected in the definite period. Further detail explanation of the detecting operation is discloses in Japanese Patent Laid-open No. H08-201542.

The beat is defined as each part of rhythmic stresses repeated in a cycle of rhythm of a tune, and consists of downbeats and upbeats. A downbeat is defined as an accented beat in a bar, especially the first beat in a bar, corresponding to the downward stroke of a conductor. An upbeat is defined as an unaccented beat in a bar. In duple time the order of the beats is as downbeat-upbeat. In triple time the order of the beats is as downbeat-upbeat-upbeat. In quadruple time the order of the beats is as downbeat-upbeat-downbeat-upbeat.

Therefore it is obvious that the value of BMP indicates the speed of playing a tune. Even in one tune, if the value of BMP is high the playing time becomes short, if the the value of BMP is low the playing time becomes long.

The number of the beats for sampling and the start timing of sampling are indicated through some operations on the controller 18 by the disk jockey. If the some operations are performed, the controller 18 generates an operation signal Sin. Then the CPU 17 generates the control signal Ssw on the basis of the operation signal Sin, and controls the operation of the switch 12. Further the CPU 17 calculates a sampling time on the basis of the detection signal Sbpm, and generates another control signal Scm for controlling the processing of sampling in the memory control device 13, and outputs the control signal Scm to the memory control device 13.

In addition to the above-mentioned operation, an operation for designating general performance of the mixer 1 is performed on the controller 18.

Information regarding to the operation of the mixer 1 controlled by the CPU 17, which is specifically the value of BPM, the number of the beats designated on the controller 18, and the like, is outputted as the display signal Sdp by the CPU 17, and is displayed to the disk jockey by the display 19.

The memory control device 13 samples a part of the designated tune included in the switch signal Ssw on the basis of the control signal Scm, and outputs the part to the memory 14 as a memory signal Sm, and stores it in the memory 14 temporarily. Further the memory control device 13 read the part of the tune stored in the memory 14 as the memory signal Sm if an operation for combining the part with another tune and outputting it is selected. Then the memory control device 13 outputs the part of the tune to the volume control device 16 as a sampling signal Sp.

The volume control device 16 adjusts a level of the sampling signal Sp in a conventional manner, and generates an adjusted sampling signal Svp, and outputs it to the gain adjusting device 21.

The gain adjusting devices 20, 21 adjust a gain of adjusted sampling signal Svp and the switch signal Ssw cooperating each other, and respectively generate an adjust signal Sgs, Sgv, and output them to the adder 22. If the part of the tune is sampled, the adjust signal Sgs includes an original tune and the adjust signal Sgv includes the sampled part of the tune.

The adder 22 combines the adjust signal Sgv with the adjust signal Sgs, and generates an adder signal Sad, and outputs it to the D/A converter 23. In the adder signal Sad the part of the tune included in the adjust signal Sgv is combined with the tune included in the adjust signal Sgs.

The D/A converter converts the adder signal Sad into an analog signal, and generates the mixer signal Smx, and outputs it to the amplifier 4.

In addition to the above-mentioned operation, if the sampling for a part of a tune is not performed, undescribed combining device in the mixer 1 combines original tunes each other, and generates a mixer signal Smx.

Figure 3:
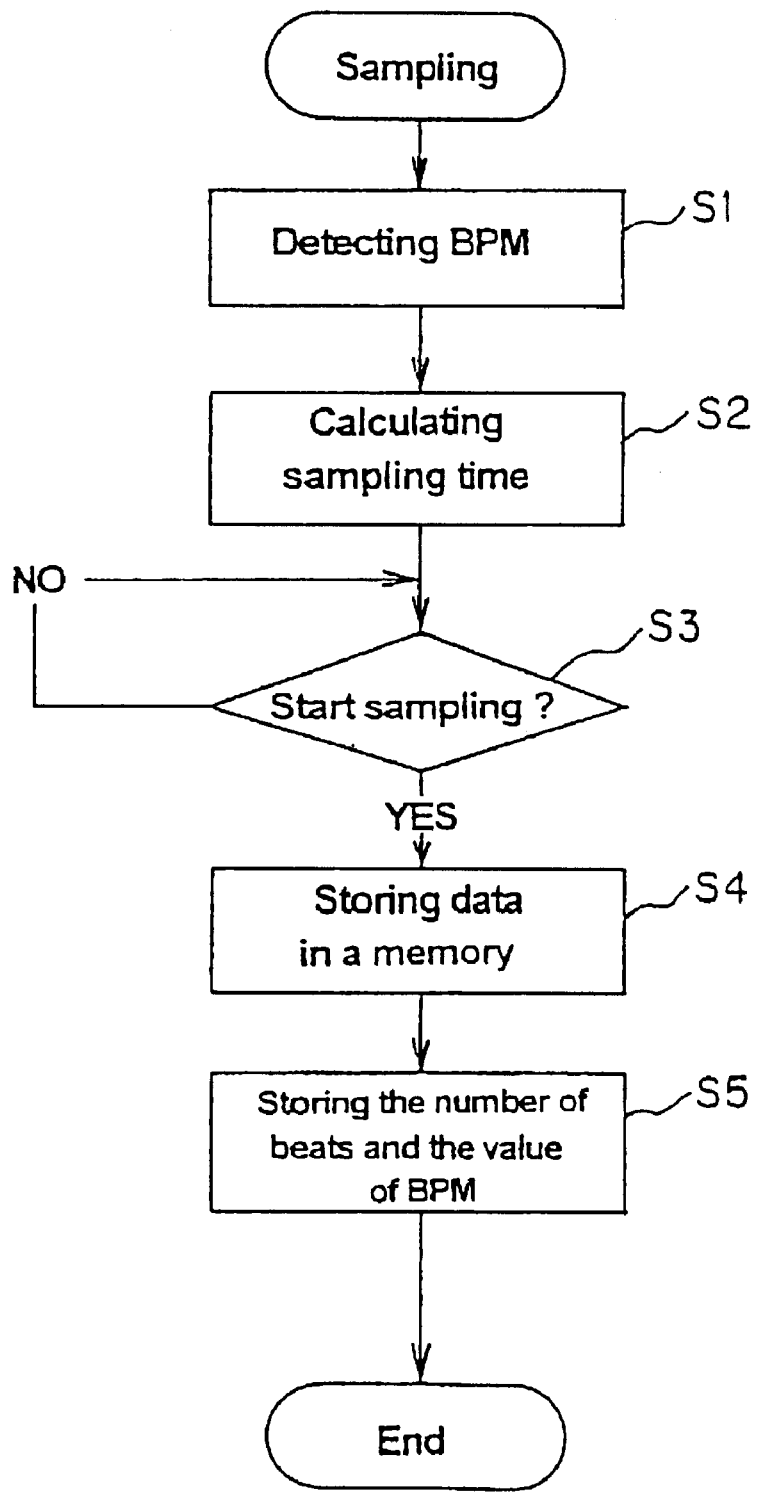
FIG. 3 is a flow diagram for showing the processing of sampling as an embodiment of the present invention.

Next, the processing of sampling which is performed in the mixer 1 is explained referring to FIG. 3. FIG. 3 is a flow diagram for showing the processing of sampling.

In the below-mentioned explanation, a part of a tune included in the tune signal Si is sampled and stored in the memory 14. Further the part is combined with another tune included in the tune signal Sii and outputted.

As shown in FIG. 3, for sampling the part of the tune included in the tune signal Si, the switch 12 is switched to a side of the tune signal Si on the basis of the control signal Scs outputted by the CPU 17. The tune signal Si is outputted to the gain adjusting device 20, the memory controlling device 13, and the BPM detecting device 15 as the switch signal Ssw. The tune included in the tune signal Si may be reproduced in the place like a nightclub by being adjusted a gain of the switch signal Ssw in the gain adjusting device 20, and outputted through the adder 12 and the D/A converter 13. Moreover the output of switch signal Ssw may be suspended in the gain adjusting device 20.

The BPM detecting device 15 detects the value of BPM in a tune included in the switch signal Ssw, which will be sampled (Step S1).

After detecting the value of BPM in the tune for sampling, a sampling time is calculated by the CPU 17 on the basis of the number of the beats for sampling designated on the controller by the disk jockey (Step S2).

Specifically, for example, assuming that the value of BPM of the tune is 120 and the number of the beats is 4, the sampling time Tsmp calculated in the Step S2 is described as follows:

$$Tsmp = (60000 \text{ ms}/120) \times 4 = 2000 \text{ ms}$$

The sampling time Tsmp calciated by the processing of the Step S1 and S2 has the time length of integral multiples (in the above formula 4 times) to the time length of one beat in the tune for sampling (in the above formula (60000 ms/120)).

After calculating the sampling time Tsmp, it is determined whether the part for sampling is reproduced in the present reproduced tune. Namely, it is determined whether the start timing for sampling has reached (Step S3). If the sampling is not started (Step S3; NO), the processing is on standby state until the start timing for sampling reaches. If the sampling is started (Step S3; YES), the processing transits to the next processing described in Step S4.

There are a variety of ways for the determination in the Step S3. Specifically, for example, it may be determined that the start timing for sampling reaches when the disk jockey presses undescribed switch for starting on the controller 18. In addition to the example, it may be determined that the start timing for sampling reaches when a sound pressure level at reproducing in the tune for sampling is higher than prescribed level (for example, −60 dB).

The latter manner is used in case as follows: If the disk jockey finds the beginning of the tune for sampling and starts playing it, a sound pressure level of the tune becomes higher than prescribed level at some time after starting. Then it is determined that the start timing for sampling reaches at the time.

In Step S1 the value of BPM is detected. Therefore in both of manners for determining in Step S3, it may be determined that the start timing for sampling reaches on the basis of the timing of the beats in the tune for sampling.

After it is determined that the start timing for sampling reaches (Step S3), the tune for sampling included in the tune signal Si is stored in the memory 14 only for the period of the sampling time calculated in the Step S2 as the memory signal Sm (Step S4).

After the sampled part of the tune is stored, the value of BPM detected in the Step S1 and the number of the beats designated by the disk jockey in the Step S2 are stored in the memory 14, brought into correspondence with the stored part.

The tune signal Sii is reproduced after the part of the tune included in the tune signal Si is stored in memory 14. The processing of combining the sampled part of the tune and another tune included in the tune signal Si or Sii reproduced by either of the player2 or the player 3 is started in the adder 22 from the timing designated on the controller 18 by the disk jockey. Then the mixer signal Smx including the combined tune is generated, and outputted to the amplifier 4, and reproduced in the nightclub by the speaker 5, 6.

As explained above, according to the operation of the mixer 1 of the embodiment, the time length between each of the beats in the sampled tune multiplied by a factor of the number of the beats designated is used for the sampling time. Further the sampling is performed on the basis of the sampling time. Therefore if the sampled part is repeatedly reproduced, the repeated tune is not getting out of rhythm.

In addition to the case of reproducing the sampled part continuously and repeatedly, even in the case that the repeated tune is intermittently reproduced keeping in time to the rhythm, it is also possible to prevent the tune from getting out of the rhythm.

Further even in the case that the sampled part is repeatedly reproduced while the repeated part is combined with another tune, it is also possible to prevent the tune from getting out of the rhythm in audibility.

The sampling time is calculated on the basis of the number of the beats designated by the disk jockey and the value of BPM so that the processing of the calculating becomes easier to be done.

Furthermore the sampling can be started from the start timing of the beat in the sampled tune so that in case of combining the sampled part and another tune it is easy to keep conformity of rhythm between the sampled part and the another tune.

The value of BPM corresponding to the sampled part and the designated number of the beats are stored in the memory 14 so that it is easy to keep conformity of rhythm between the sampled part and the another tune in case of combining the sampled part and another tune.

In the case that the present invention is adapted to the reproduction of the tunes for dancing in the nightclub, the combined tune between the sampled tune and the another tune is reproduced in a good rhythm so that it is easy to keep on dancing comfortably.

In addition to the construction of the audio information outputting device S of the embodiment, the present invention can be adapted to the audio information outputting device having a device called an effector which adds the special effects, such as reverberant sound effect and the like, to the tune.

In the above-mentioned embodiment two players of the player 2 and the player 3 is connected to the mixer 1. However in addition to the construction of the embodiment, the present invention can be adapted to the audio information outputting device having more than two of the players connected to the mixer 1. In this case, for example, parts of tunes outputted from more than one player may be combined with a tune outputted from the other player.

The invention may be embodied in other specific forms without departing from the the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. H11-211277 filed on Jul. 26, 1999 including the specification, claims, drawings and summary is incorporated herein by reference in its entirety.

What is claimed is:

1. An apparatus for sampling partial music from music and storing the sampled partial music in a memory device comprising:
   a sampling device for sampling the partial music from the music, the sampling being performed in a calculated sampling time equal to an integral multiple of a measured time interval between each beat and a next beat in the music, and
   a storing device for storing the sampled partial music in a memory device as stored partial music.

2. An apparatus according to claim 1, wherein said sampling device starts sampling based on the timing of beats in the music.

3. An apparatus according to claim 1, wherein said apparatus-further comprises an outputting device for reading the stored partial music from the memory device, and combining and outputting the stored partial music with another music.

4. An apparatus according to claim 1, wherein said apparatus further comprises an outputting device for reading the stored partial music from the memory device and repeatedly outputting the read stored partial music.

5. An apparatus according to claim 1, wherein said apparatus is adapted for use by a disk jockey.

6. A method of sampling partial from music and storing the sampled partial music in a memory device comprising:
   a sampling process of sampling the partial music from the music, the sampling being performed in a calculated sampling time which is equal to an integral multiple of a measured time interval between each beat and a next beat in the music, and
   a storing process of storing the sampled partial music in a memory device as stored partial music.

7. A method according to claim 6, wherein said sampling process starts sampling based on the timing of beats in the music.

8. A method according to claim 6, wherein said method further comprises an outputting process of reading the stored partial music from the memory device, and combining and outputting the stored partial music with another music.

9. A method according to claim 6, wherein said method further comprises a step of reading the stored partial music from the memory device and repeatedly outputting the read stored partial music.

10. An apparatus according to claim 6, wherein said steps are directed by a disk jockey.

11. A music sampling apparatus, comprising:
   plural players, each of the plural players respectively generating a tune signal of plural beats; and
   an audio mixer connected to: i) accept the tune signals outputted from the plural players, ii) sample at least one of the tune signals, based on a calculated sampling time equal to an integral multiple of a measured time interval between each beat and a next beat, to create a partial music, and iii) combine the partial music with another music signal into a final mixer signal for playing.

12. The apparatus of claim 11, further comprising:
   an amplifier (4) connected to the mixer to output audio information corresponding to the final mixer signal to play a final musical tune via speakers, wherein,
   the amplifier separates the final mixer signal into a left channel signal and a right channel signal,
   the amplifier amplifies the left and right channel signals, and
   at least one of the players is one of i) an analog player reproducing an analog record of a tune, and ii) a digital player reproducing a digital record of a tune.

13. The apparatus of claim 11, wherein, the mixer is operable by a disk jockey to selectively mix various ones of the plural tune signals.

14. The apparatus of claim 11, wherein,
   the mixer comprises:
     plural analog to digital converters connected to outputs of the plural players;
     a switch selectable between outputs of the plural analog to digital converters;
     a beat-per-minute detecting device connected to the switch to determined the sampling time of the tune signal provided via the switch;
     a memory operatively connected to the detecting device to store the partial music sampled, via the switch, based on the sampling time; and
     an adding device operatively connected the memory and to the switch to combine the stored partial music, from the memory, with the another music signal from the switch.

15. The apparatus of claim 14, wherein,
   each analog to digital converter converts a corresponding tune signal into a digital signal to generate a digital tune signal, the digital tune signal output to input terminals of the switch,
   at a first time, the switch selects one of the analog to digital converters to be connected to the detecting device to provide a tune for sampling to the detecting device,
   the detecting device detects a value of a number of beats per a minute in the tune for sampling to generate a detection signal,
   the sampling time is calculated from the detection signal,
   at a subsequent second time, the tune for sampling is sampled based on the calculated sampling time as sampled partial music, and
   the sampled partial music is stored in the memory as stored partial music.

16. The apparatus of claim 15, wherein,
   the value of the number of beats per minute is calculated based on time lengths between each beat and the next beat in the tune for sampling, the tune for sampling being continuously detected over a selected period of time,
   the beat is defined as each part of rhythmic stresses repeated in a cycle of rhythm of the tune for sampling, and
   the number of the beats for sampling and the start timing of sampling is user selectable.

17. The apparatus of claim 16, wherein,
   the stored partial music is combined with the another music signal by fading the another music signal and adding in the stored sample partial music.

* * * * *